United States Patent [19]
Cherukuri

[11] Patent Number: 5,878,217
[45] Date of Patent: *Mar. 2, 1999

[54] NETWORK CONTROLLER FOR SWITCHING INTO DMA MODE BASED ON ANTICIPATED MEMORY OVERFLOW AND OUT OF DMA MODE WHEN THE HOST PROCESSOR IS AVAILABLE

[75] Inventor: Ravi K. Cherukuri, Fremont, Calif.

[73] Assignee: Cirrus Logic, Inc., Fremont, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 959,544

[22] Filed: Oct. 24, 1997

Related U.S. Application Data

[63] Continuation of Ser. No. 343,794, Nov. 21, 1994, abandoned.

[51] Int. Cl.[6] .............................. G06F 15/16; G06F 12/00
[52] U.S. Cl. ................................ 395/200.42; 395/200.66; 395/877; 395/843
[58] Field of Search ........................ 395/200.42, 200.64, 395/200.66, 200.67, 200.8, 842, 843, 848, 851, 871, 877, 825; 370/85.1

[56] References Cited

U.S. PATENT DOCUMENTS

| | | |
|---|---|---|
| 4,530,053 | 7/1985 | Kriz et al. .............................. 395/842 |
| 4,933,840 | 6/1990 | Sera et al. ............................... 395/877 |
| 5,107,416 | 4/1992 | Jippo et al. .............................. 395/275 |
| 5,107,457 | 4/1992 | Hayes et al. ............................. 395/800 |
| 5,151,999 | 9/1992 | Marzucco et al. ....................... 395/800 |
| 5,175,818 | 12/1992 | Kunimoto et al. ................... 395/200.2 |
| 5,247,626 | 9/1993 | Firoozmand ...................... 395/200.07 |
| 5,295,246 | 3/1994 | Bischoff et al. ......................... 395/250 |
| 5,301,279 | 4/1994 | Riley et al. .............................. 395/861 |
| 5,305,441 | 4/1994 | Okochi et al. ........................... 395/310 |
| 5,412,782 | 5/1995 | Hausman et al. ....................... 395/250 |
| 5,440,691 | 8/1995 | Carrafiello et al. ..................... 395/250 |
| 5,452,432 | 9/1995 | Macachor ................................ 395/842 |
| 5,485,584 | 1/1996 | Hausman et al. ....................... 395/842 |
| 5,487,154 | 1/1996 | Gunji ...................................... 395/842 |

*Primary Examiner*—Larry D. Donaghue
*Attorney, Agent, or Firm*—Lowe Price LeBlanc & Becker; David L. Stewart; Frank D. Nguyen

[57] ABSTRACT

A network controller has a default non-DMA mode of data transfer that transfers received data frames to a desired location in internal memory under control of a host CPU. A DMA mode of data transfer is engaged to transfer accumulated data frames via a DMA controller to system memory when the host CPU is not available to handle the frame processing. An automatic switch back mechanism is provided to allow the network controller to automatically switch back to the non-DMA data transfer mode as soon as the host CPU is able to return to processing of received frames.

23 Claims, 4 Drawing Sheets

FUNCTIONAL BLOCK DIAGRAM
OF THE CS8900
NETWORK CONTROLLER they must contend for its use in transmitting or receiving
NETWORK CONTROLLER FOR SWITCHING INTO DMA MODE BASED ON ANTICIPATED MEMORY OVERFLOW AND OUT OF DMA MODE WHEN THE HOST PROCESSOR IS AVAILABLE This application is a continuation of application Ser. No. 08/343,794 filed Nov. 21, 1994, now abandoned.

TECHNICAL FIELD

This invention relates generally to data communication systems, and more particularly, to a method of and system for automatically switching a network controller from a Direct Memory Access (DMA) data transfer mode back to a non-DMA data transfer mode.

BACKGROUND ART

The task of accommodating increasing bus traffic in data communication networks continues to pose as a challenge. The primary bottle-neck in most data communication networks appears to be the system bus. The system bus is a bottle-neck primarily because many devices share the same bus and must contend for its use in transmitting or receiving data. For, this reason, the system bus may be unavailable at crucial times for reasons such as operating priorities, system interrupts, and other bus traffic. Thus, in a computer system, it is necessary to buffer data received to accommodate bus traffic with other data devices.

Examples of devices buffering data received to accommodate bus traffic with other data sources and sinks include data conversion devices. Data conversion devices are basically front end communications processors that act as the interface between the host CPU and external terminals. Data conversions devices provide limited internal storage to continue receiving data from data sources while waiting for converted data to be moved to data sinks via the system bus.

Since the prior art solution is to provide storage capability while the system bus is busy, there exists an inherent problem in the prior art solution. This problem manifests when the period during which the system bus remains busy is long enough so that the amount of data accumulated in the temporary storage exceeds its storing capacity. When that occurs, data may be lost. To prevent data loss, data must be transferred to another location.

Generally, the data transport techniques most commonly used are Programmed I/O and Direct Memory Access (DMA). With Programmed I/O, the Host CPU is involved in every aspect of the data transport process. Even if the network adapter's control and data port parameters are defined and mapped in system memory, the performance of the network/system interface is, in most cases, limited by the CPU's input/output bandwidth and system bus utilization. Moreover, because Programmed I/O utilizes the CPU in every aspect of transferring data, when used as the transport mechanism in preventing data loss due to other bus traffic, this technique or those using the Host CPU as the main driving force in the data transport process is subject to an additional possibility of data loss when CPU interrupt latency rises due to CPU workload.

Direct Memory Access (DMA), on the other hand, is designed to transfer large "blocks or units of data" with little or no Host CPU intervention. Most DMA transport mechanisms are based on the Master-Slave transport model. With this type of transport mechanism, the Host CPU initiates the data move or transfer, and once started, the Host CPU is not involved again until the entire "block or unit of data" has been transferred. For this reason, DMA is much more efficient in term of CPU time required and is a preferred method to transfer large blocks of data than Programmed I/O or other CPU-intensive data transfer methods on the whole. On the other hand, DMA data transfer is slower than Programmed I/O and other CPU-intensive data transfer methods due to the extra moving steps involved in DMA transfer. Moreover, DMA techniques, such as DMA masters and DMA slaves, have their limitation in that additional processing is normally required to move data from where the DMA process puts it to the data sink (e.g., a specified application memory location). This is because the DMA controller is not able to determine the type and size of data, and the CPU must examine the data to determine the proper data sink.

For the above reasons, in devising a data transport technique to use in moving data from the temporary storage buffer to another location, a dual approach, which utilizes non-DMA data transfer (e.g., Programmed I/O) to move data to the proper sink in most instances but switches to DMA transfer if the internal storage limit is approached (i.e., when the host CPU is slow due to higher priority tasks), is most desirable.

The structure and operation of the auto-DMA mechanism that provides switching from a non-DMA mode to a DMA mode are disclosed in more detail in co-pending application Ser. No. 08/343,073, entitled "NETWORK CONTROLLER HAVING AUTOMATICALLY INVOKED DMA DATA TRANSFER," to Peter Ecclesine, filed concurrently herewith and incorporated herein by reference. However, when the host CPU is again available to process received data, it is desirable to provide switching back from the DMA mode of operation to the non-DMA mode as soon as possible.

Also, it is desirable to provide a DMA-to-non-DMA switching mechanism that keeps the data in the proper sequence since switching may cause the order of the data to be processed out of its intended sequence.

SUMMARY OF THE INVENTION

A network controller for receiving data frames having a non-DMA data transfer mode for transferring data frames received from a network and stored in an internal memory buffer for processing by a host processor to a desired location and a DMA data transfer mode for transferring the received data frames via a DMA transport means to a system memory. A buffer manager coupled to the internal memory buffer for switching the network controller from the non-DMA mode to the DMA mode when overflow of the internal memory buffer is anticipated, and a switch back controller provides automatically switching back to the non-DMA mode when the host processor completes processing the DMA transferred data frames.

BEST MODE FOR CARRYING OUT THE INVENTION

Figure 1:
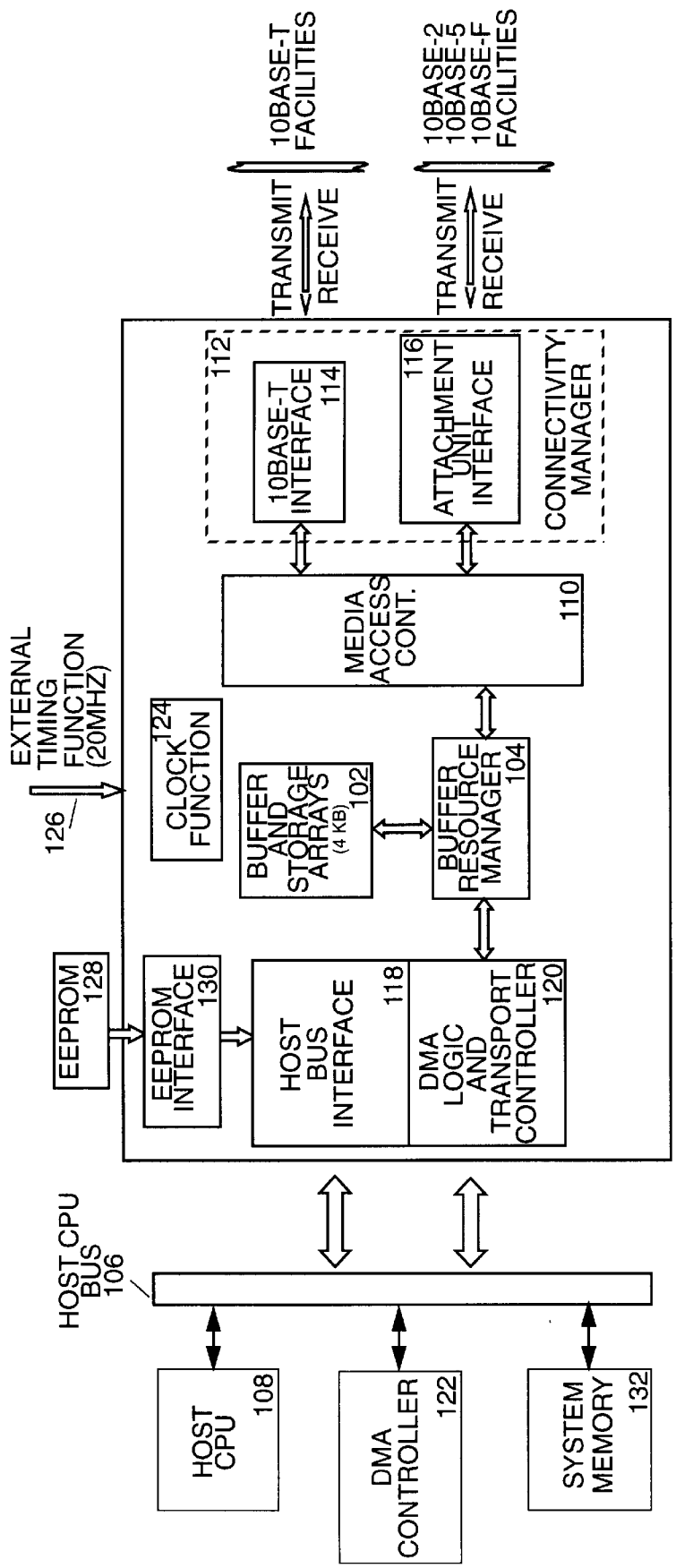
FIG. 1 shows a block-diagram of the CS8900 network controller.

Although the invention has general applicability in the field of data transfer using a DMA controller, the best mode for practicing the invention is based in part, on the realization that the current invention is implemented as part of the Crystal Semiconductor CS8900 network controller shown in FIG. 1. The CS8900 is manufactured and marketed by Crystal Semiconductor, Inc. of Austin, Tex. As a network controller, the CS8900 is a front end communications interface between the host CPU and terminals in the Ethernet environment. It is to be understood that the invention is applicable to any type of data conversion device, to any kind of data, and to any type of system-based memory facility. More particularly, the invention applies in any scenario which involves switching from a DMA data transfer mode to a non-DMA data transfer mode without resetting and reprogramming the device.

FIG. 1 is an overall block diagram of the CS8900 which implements the present invention in its design. The CS8900 network controller provides management and storage mechanism for multiple data blocks or frames of varying length and type received from a network. In particular, it comprises a buffer and storage arrays 102 capable of storing about 4 kilobytes of data. A buffer resource manager 104 manages and controls access to buffer 102. Media access controller 110 is coupled to the buffer resource manager 104 to manage data transmitted to and received from the network. It performs all of the Ethernet functions required by sections 3 and 4 of the ISO/IEC 8802-3 standard such as collision detection, back-off/retry, preamble generation and detection, and cyclic redundancy code (CRC) generation and testing. Connectivity manager 112 is coupled to media access controller 110 to support twisted pair (10BASE-T) interface 114 and attachment unit interface 116. These interfaces transmit and receive data via 10BASE type networks that are in compliance with ISO/IEC 8802-3. Filters may be provided to connect unshielded and shielded cables directly to the network controller.

Host bus interface 118 provides an interface with host CPU 108 via system/host CPU bus 106. Data transfer is normally supported by host CPU 108 via host bus interface 118. DMA logic and transport controller 120 supports DMA data transfer to system memory 132 through DMA lines. DMA controller 122, on the other hand, provides the necessary interface with host CPU 106 for all DMA data transfer operations. DMA controller 122 may be a part of the network controller chip or may alternatively be external with respect to the chip.

Clocking function on the chip is provided by either crystal oscillator 124 or by 20 MHz TTL external input 126. EEPROM 128 is a non-volatile memory that stores configuration and set-up parameters of the network controller. EEPROM 128 is coupled to the network controller through EEPROM interface 130. More particularly, EEPROM interface 130 provides the connection between EEPROM 128 and host bus interface 118.

The network controller has the capability to select the most effective method of moving data frames received across system/host CPU bus 106 to system memory 132 or any other specified locations that share a bus with the host CPU. In selecting the most effective data transport mode, the network controller first alerts host CPU 108 that the number of data frames accumulated in buffer 102 is approaching its capacity. Next, the network controller signals the host CPU to start transfer data from buffer 102. In the event the host CPU is slow in unloading data frames from buffer 102 (e.g., the host CPU may be occupied with higher priority tasks), the network controller automatically switches to the DMA slave mode to move the accumulated data frames via DMA controller 122 to system memory 132. Because data frames may be lost if the host CPU does not perform the requested data transfer in a timely manner, the auto-receive DMA mode is used to prevent data loss. In the auto-receive DMA mode, the network controller chip monitors its buffer capacity and data stream. This monitoring process enables the network controller to switch to the DMA slave mode when data loss is anticipated.

As an additional feature, the network controller's transport mechanism incorporates a memory address scheme that allows the network/system interface to appear as part of the system memory. As a result, data can be transferred to buffer 102 in a single contiguous transfer.

Figure 2:
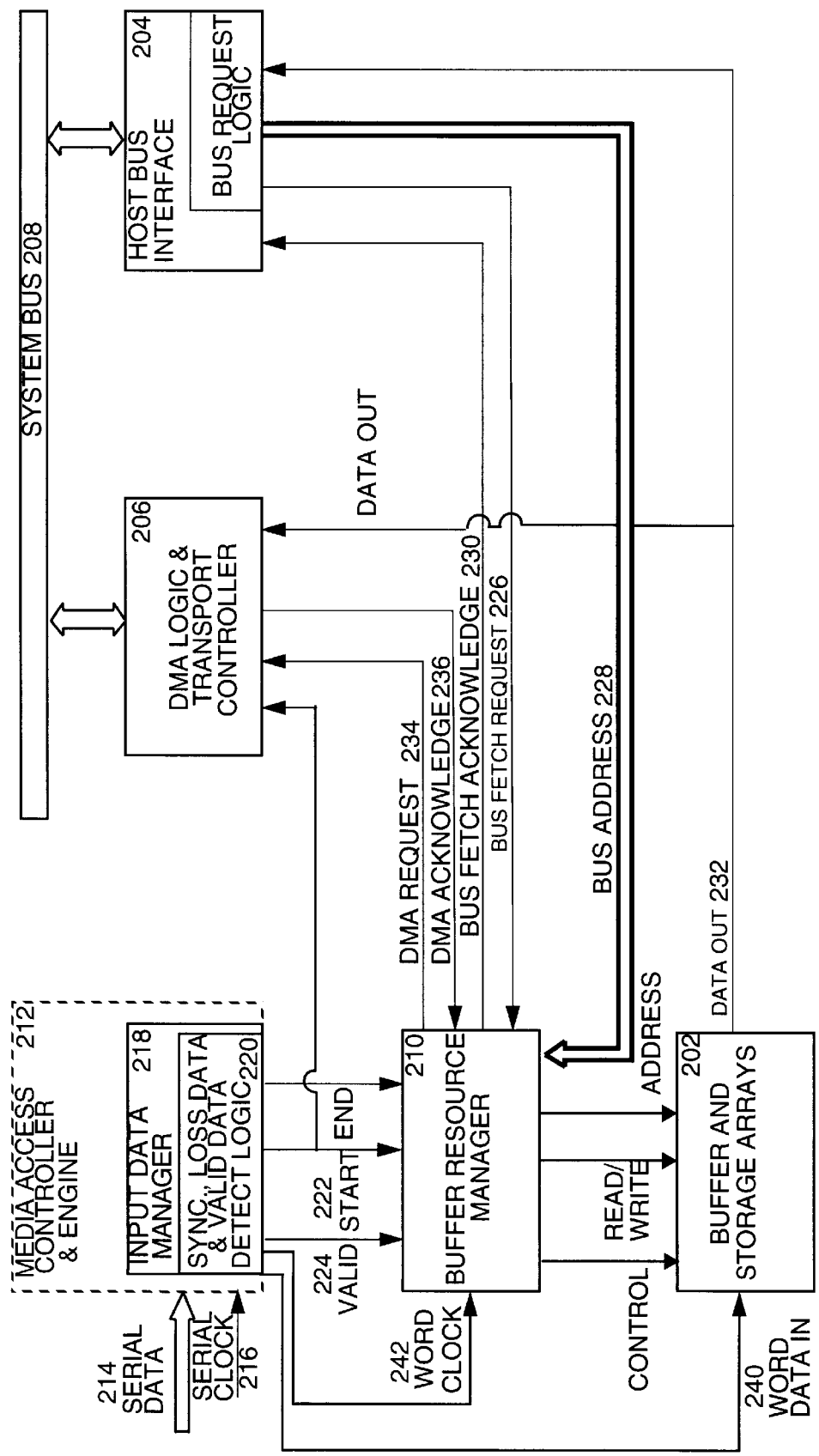
FIG. 2 illustrates an auto-receive DMA mode in accordance with the present invention.

FIG. 2 is block diagram illustrating how the auto-receive DMA data transfer mode is implemented in the present invention. Under the auto-receive DMA scheme, data frames stored in the network controller's buffer and storage arrays 202 can be transferred by host CPU 108 or transferred from the buffer in a DMA slave mode across system bus 208 (shown in FIG. 1 as system bus 106) to a specific location in system memory 132. In non-DMA transfer, host CPU 108 accesses buffer and storage arrays 202 via host bus interface 204. In DMA transfer, DMA logic & transport controller 206 is used to transfer data frames stored in buffer and storage arrays 202 (hereinafter memory buffer 202) to system memory 132.

The host CPU and system memory share system bus 208 which is also coupled to host bus interface 204 and DMA logic & transport controller 206. As discussed earlier, host bus interface 204 provides the interface between host CPU 108 and the network controller. Likewise, DMA logic & transport controller 206 provides the interface between DMA controller 122 and the network controller.

Buffer resource manager 210 controls the data read and write operations of buffer 202. Buffer resource manager 210 also arbitrates between requests for read access to buffer 202 by host interface 204 and by DMA controller 206 as well as write access to store data frames received in memory buffer 202.

Serial data stream 214 and serial clock signal 216 are provided as inputs to media access controller & engine 212. Media access controller & engine 212 comprises input data manager 218 and synchronous, loss data, & valid data detector logic 220. Media access controller & engine 212 formats data from serial data stream 214 into a formatted data frame which is checked by synchronous, loss data, & valid data detector logic 220 to determine whether the frame's delimiter field, destination address field, and an active carrier are present. If the delimiter field, destination address field, and active carrier are all present, a valid signal is provided to buffer resource manager 210 to signal to buffer resource manager 210 that the serial data stream being received is valid. Examples of invalid data include losing a carrier or having an improper address. Media access controller & engine 212 further provides buffer resource manager 210 with a start of frame signal to indicate the beginning of valid data flow. The start of frame signal is also provided to DMA logic & transport controller 206 to be used in assembling data on a data content basis. Eventually, media access controller & engine 212 provides buffer resource manager 210 with an end of frame signal to indicate end of the data flow. Moreover, media access controller & engine 212 synchronizes, reframes, and provides serial-to-parallel conversion to the data received.

To write data into memory buffer 202, buffer resource manager 210 provides memory buffer 202 with control and address information to go with word data 240 and word clock 242 from media access controller & engine 212. To read data from memory buffer 202 in the non-DMA data transfer mode, host bus interface 204 provides buffer resource manager 210 with bus fetch request 226. Host bus interface 204 also sends bus address signal 228 to specify the address of the data to be read out. In response, buffer address manager 210 sends host bus interface bus 204 fetch acknowledge signal 230. Based on the memory address decoded from bus address signal 228, data is retrieved from the appropriate memory locations in buffer 202 and sent to host bus interface 204 via data out line 232.

On the other hand, to engage DMA logic & transport controller 206 in reading data frames stored in memory buffer 202, buffer resource manager 210 sends DMA request signal 234 to DMA logic & transport controller 206. In response, DMA controller 206 sends DMA acknowledge signal 234 to buffer resource manager to start the process. Memory buffer 202 uses the same data out port 232 to transfer data from buffer 202 in both non-DMA transfer mode and DMA transfer mode.

A summary of the auto-receive DMA mode implemented in the present invention is presented next. In this mode, data frames received are first stored in memory buffer 202 and are normally transferred by host CPU 108 via host interface 204 to a desired location. When data loss is anticipated such as when there is not enough room in memory buffer 202 to hold at least one more whole frame, buffer resource manager 210 terminates the non-DMA data transfer mode and engages DMA logic & transport controller 206 to DMA transfer data frames from buffer 202 to system memory 132. The structure and operation of the auto-DMA mechanism that provides switching from a non-DMA mode to a DMA mode are disclosed in more detail in co-pending application SN (unassigned), entitled "NETWORK CONTROLLER HAVING AUTOMATICALLY INVOKED DMA DATA TRANSFER," to Peter Ecclesine, filed concurrently herewith and incorporated herein by reference.

As discussed in the Background, non-DMA data transfer (e.g., Programmed I/O) is faster than DMA data transfer. Accordingly, to increase throughput of the communication system, the network controller should switch from DMA transfer back to non-DMA transfer as soon as the host CPU is again available to handle the frame processing. However, switching from DMA transfer back to non-DMA transfer may cause data to be processed out of sequence because the data that was DMA transferred to system memory 132 needs to be processed by the CPU when it is available. Because the CPU may become available before a DMA frame transfer is complete, the CPU may start processing new data frames thereby causing these new data frames to be out of sequence with respect to those that were DMA transferred. Although out-of-sequence data frames can still be sorted out through the use of information included with the data frames, this process is time consuming and should be avoided if it is at all possible. As a result, in switching from DMA transfer back to non-DMA transfer, data frames should be kept in the same intended sequence.

Figure 3:
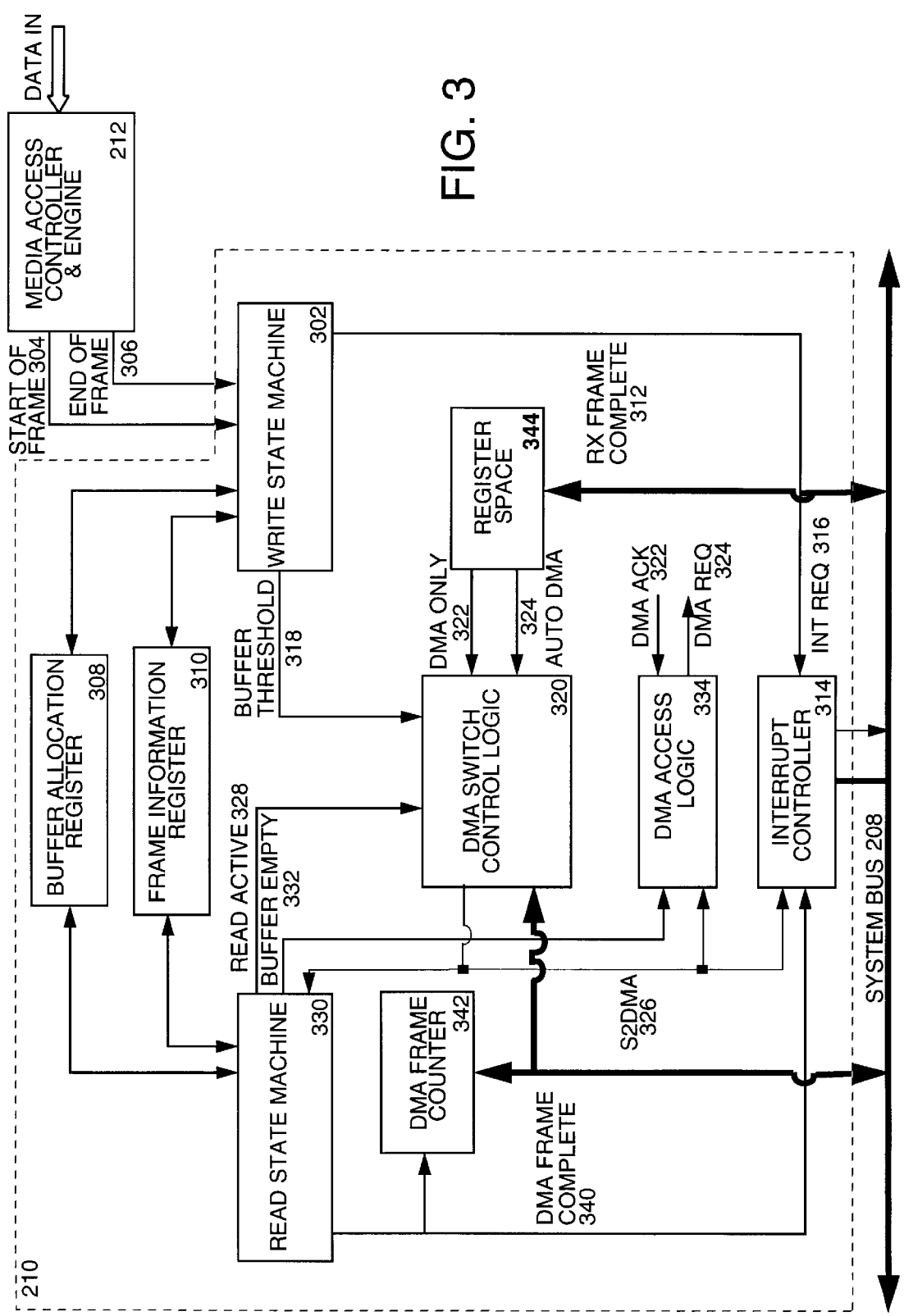
FIG. 3 depicts an auto-switchback mechanism in accordance with the present invention.

Reference is now made to FIG. 3 in which an auto-switch back mechanism for switching from the DMA data transfer mode back to the non-DMA data transfer mode is disclosed. The auto-switchback mechanism allows the network controller to remain in the DMA transfer mode until all of the data frames transferred via DMA have been processed by the host CPU. Auto-switch back circuit 300, which may be incorporated in buffer resource manager 210, comprises as one of its components write state machine 302.

Write state machine 302 receives start of frame signal 304 and end of frame signal 306 from media access controller and engine 212. Start of frame signal 304 helps write state machine 302 to detect the start of the incoming data in order to know when to request buffer allocation register 308 for allocation of buffer units in memory buffer 202 to store the incoming data frame. To that extent, buffer allocation register 308 provides information as to whether or not memory buffer 202 has allocated buffer units to the incoming data frame. When write state machine 302 receives the addresses of the allocated buffer units, it writes this information into frame information registers 310. In the event the buffer units allocated to the incoming data frame are the last available buffer units, write state machine 302 provides DMA switch control logic 320 with buffer threshold signal 318 to indicate that no more space is available in memory buffer 202. When write state machine 302 receives end of frame signal 306, it provides frame information registers 310 with the data frame's last word address of memory buffer 202. Upon receiving end of frame signal 306, write state machine 302 also sends rx-frame-complete signal 312 to notify interrupt controller 314 that the incoming data frame has been completely received. If the network controller is not in a DMA mode, the interrupt controller 314 generates an interrupt request 316 to the host CPU. When the host CPU responds to the interrupt, interrupt controller provides it with a receive frame complete message which is associated with the completion of a non-DMA data transfer. Receive frame complete message is discussed more fully below.

Register space 344 contains configuration information provided by the host CPU to configure the network controller to operate in either the auto-receive DMA mode or in the DMA only mode. Register space 318 is coupled with DMA switch control logic 320 to engage the network controller in the desired data transfer mode. Register space 344 provides DMA switch control logic 320 with a DMA only signal 322 when the network controller operates in the DMA only mode. On the other hand, register space 344 provides DMA switch control logic 320 with auto-DMA signal 324 when the network controller operates in the auto-receive DMA mode.

When DMA switch control logic 320 receives buffer threshold signal 318, which signifies that memory buffer 202 is nearly full, and the network controller is operating in the auto-receive DMA mode, DMA switch control logic 320 generates s2dma signal 326 to switch to the DMA data transfer mode. However, DMA switch control logic 320 does not generate s2dma signal 326 if it also receives read active signal 328 provided by read state machine 330 indicating that some storage units in memory buffer 202 are being freed up because data frames are being read from memory buffer 202.

When read state machine 330 receives s2dma signal 326 from DMA switch control logic 320, it becomes active and reads the information contained in frame information register 310 including the addresses of buffer units allocated for data frames storage in memory buffer 202. If buffer memory 202 is empty and an incoming data frame has not been received, read state machine 330 activates buffer empty signal 332 to signify that memory buffer 202 is empty. When read state machine 330 becomes active, it activates read active signal 328 and deactivates buffer empty signal 332 to prevent the network controller from switching back to non-DMA data transfer before the transfer of an entire data frame from memory buffer 202 to the system memory has been completed.

S2dma signal 326 and buffer empty signal 332 are provided to DMA access logic 334 to control whether to engage in DMA data transfer. If s2dma signal 326 is activated and buffer empty signal 332 are de-activated, DMA access logic 334 generates and sends DMA request signal to DMA logic & transport controller 206. In response, DMA logic & transport controller 206 provides DMA acknowledgement signal 338 to DMA access logic 334.

When the DMA transfer of a data frame from memory buffer 202 to system memory has been completed, read state machine 330 generates and sends DMA frame complete signal 340 to interrupt controller 314 telling it to generate an interrupt to the host CPU. The host CPU is informed of whether the network controller is engaging in DMA transfer or non-DMA transfer by examining the type of message received by interrupt controller 314. The first type of message is named DMA frame complete which is construed when interrupt controller 314 receives activated s2dma signal 326 and activated DMA frame complete signal 340. The DMA frame complete message informs the host CPU that a DMA frame transfer has been completed. The second type of message is named receive frame complete which is construed when interrupt controller 314 receives deactivated s2dma signal 326 and activated rx frame complete signal 312. The receive frame complete message informs the host CPU that a non-DMA frame transfer has been completed. In either case, interrupt controller 314 provides the host CPU with the appropriate message when the host CPU responds to interrupt request 316 provided by interrupt controller 314. Alternatively, the event may be written by interrupt controller 314 into an event queue register that can be polled by the host CPU.

DMA frame counter 342 keeps track of the number of data frames that have been DMA transferred by using DMA frame complete signal 340 to increment its count value. In other words, DMA frame counter 342 increments its count value every time a data frame has been completely DMA transferred. On the other hand, the count value is reset to zero every time it is read by the host CPU. The host CPU proceeds to read the DMA frame count when it receives a DMA frame complete message from interrupt controller 314.

Under the present invention, the network controller engages in DMA data transfer when the host CPU is unavailable due to higher priority tasks. For this reason, the data frames that are DMA transferred need to be processed by the host CPU when it becomes available. Because DMA frame counter 342 keeps track of the number of data frames that have been DMA transferred, its count value is utilized to track data frames that were DMA transferred but not yet processed by the CPU. Thus, in response to a DMA frame complete message, the host CPU reads the count value of DMA frame counter 342 and proceeds to perform the required processes on the number of data frames indicated by counter 342. While DMA frame counter 342 is reset every time it is read by the host CPU, more data could be DMA transferred during the time the host CPU processes the previous data frames. For this reason, counter 342 starts to count again immediately following a reading by the host CPU. The next time the host CPU reads the counter 342, if the count is not zero (i.e., more frames were transferred via the DMA transport while the host processor was processing the previous frames), the host CPU processes these new data frames. This procedure is repeated until the host processor reads a DMA frame count of zero. Thus, by keeping track of the number of data frames that have been DMA transferred, the host processor can avoid the problem of processing data frames out of sequence.

When the host processor reads a DMA frame count of zero and there are no more frames to be DMA transferred, the network controller automatically switches out DMA mode by deactivating s2dma signal 326. At this point, newly received data frames are reported to the host processor through receive frame complete message and read out in the non-DMA data transfer mode.

Figure 4:
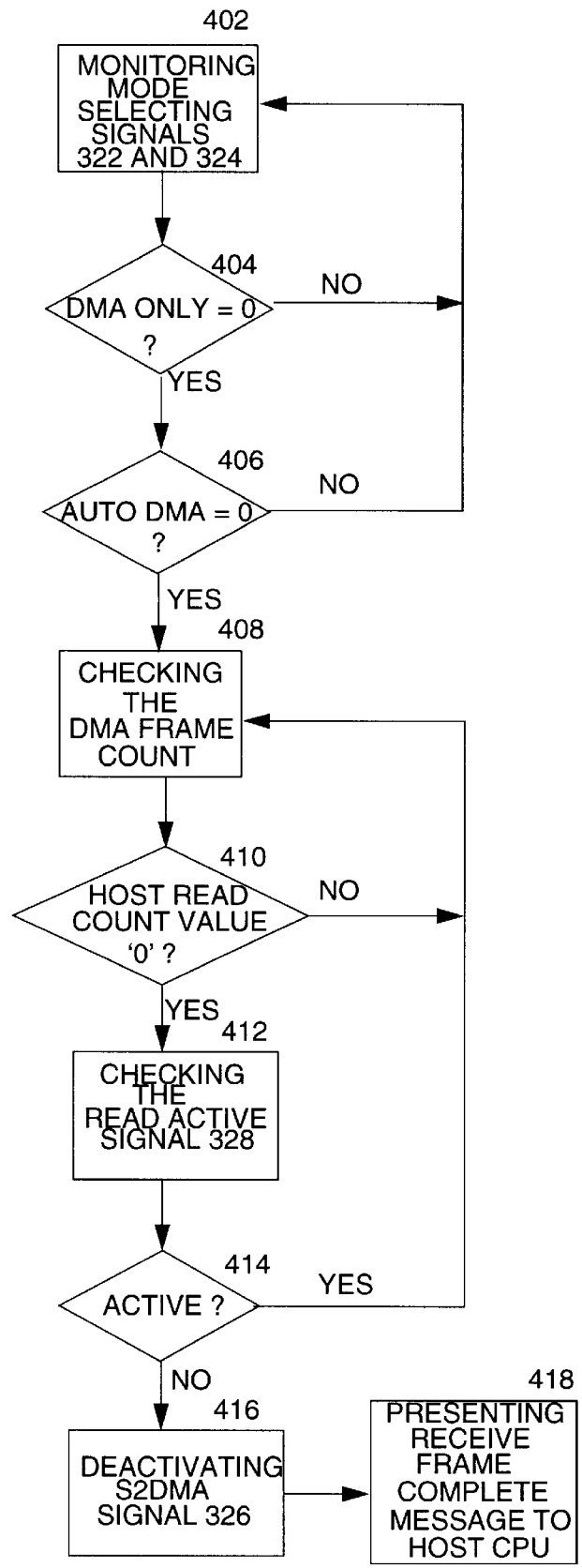
FIG. 4 illustrates the operation of the DMA switch control logic shown in FIG. 3.

Reference is now made to FIG. 4 which describes the operation of DMA switch control logic 320. DMA switch control logic 320 monitors the mode selecting signals, DMA only signal 322 and auto-DMA signal 324, (block 402) to determine whether or not both of these signals are set to zero (blocks 404 and 406, respectively). If so, DMA switch control logic 320 checks to see whether the host processor reads a zero value from DMA frame counter 342 (block 408). If the DMA frame count is not zero, DMA switch control logic 320 continues to check the count value of DMA frame counter 342 (block 410). Otherwise, DMA switch control logic 320 proceeds to determine the status of read active signal 328 (block 412). If read active signal 328 is not active (block 414), indicating that no frames are being read from memory buffer 202, DMA switch control logic 320 deactivates s2dma signal 326 (block 416) to signal to DMA access logic 334 that no further DMA requests should be sent. Read state machine 330 is also notified that the network controller is not in the DMA mode. When the s2dma signal 326 is not activated, interrupt controller 314 presents the receive frame complete message to the host CPU (block 418) to initiate the non-DMA data transfer mode.

Hence, DMA switch control logic 320 delays switching back from the DMA data transfer mode until all data frames that were DMA transferred while the host CPU was busy are reported to the host CPU. The switch-back is executed automatically when DMA frame counter 342 is set to zero and read active signal 328 is not activated.

There accordingly has been described a network controller having a switch-back mechanism for automatically switching from DMA data transfer mode to a non-DMA data transfer mode in an auto-receive DMA mode of operation. A DMA frame counter counts the number data frames DMA transferred while the host CPU is busy. In response to an event indicating that the DMA transfer of a frame via the DMA system is complete, the host CPU reads the DMA frame count to determine the number of data frames required processing. Upon reading the DMA frame count, the controller resets the count to zero. A DMA switch control logic determines whether the host processor reads a DMA frame count of zero and whether any data frame is being read from an internal memory buffer. When the host processor reads a DMA frame count of zero and no frame is being read from the memory buffer, the network controller switches back to the default non-DMA data transfer mode.

Accordingly, the network controller provides a flexible mechanism that automatically switches from the DMA data transfer mode back to the default non-DMA mode as soon as the host CPU is free from its previous duties. As a result, the throughput of the communication system is increased. Because the switchback back is delayed until the frames previously transferred via the DMA system are processed, data loss is prevented.

In this disclosure, there are shown and described only the preferred embodiments of the invention, but it is to be understood that the invention is capable of changes and modifications within the scope of the inventive concept as expressed herein.

I claim:

1. In a network controller for receiving data frames having a non-DMA data transfer mode for transferring the data frames received from a network and stored in an internal buffer memory for processing by a host processor to a desired location and a DMA data transfer mode for transferring the received data frames via a DMA transport circuit into a system memory, a circuit for switching between said non-DMA mode and said DMA mode comprising:

a buffer manager responsive to said internal memory buffer for switching said network controller from said non-DMA mode to said DMA mode when overflow of said internal memory buffer is anticipated, and a switch back controller responsive to said host processor for monitoring mode selecting signals and, when in auto-DMA mode, if a zero value exists in a DMA frame counter when no frames are being read from said buffer automatically switching said network controller back to said non-DMA mode.

2. The system of claim 1, wherein said host processor reads a count of said DMA frame counter to determine a number of data frames to be processed.

3. The system of claim 2, wherein said DMA frame counter is reset by said host processor after reading said count.

4. The system of claim 3, wherein said switch back controller further comprises a switch control circuit responsive to said count for disengaging said DMA data transport circuit from said memory buffer.

5. The system of claim 4, wherein said switch control circuit prevents said DMA transport circuit from being disengaged from said memory buffer while a frame is being read from said memory buffer.

6. The system of claim 5, wherein said host processor is responsive to a first message indicating that a complete frame has been transferred via said DMA transport circuit.

7. The system of claim 6, wherein said first message is generated by an interrupt controller provided with a DMA enabling signal from said switch control circuit to interrupt said host processor when a complete frame has been transferred via said DMA transport circuit.

8. The system of claim 7, wherein said DMA enabling signal is provided to a DMA access circuit to request said DMA transport circuit to be engaged.

9. The system of claim 8, wherein said switch control circuit deactivates said DMA enabling signal to disengage said DMA transport circuit.

10. The system of claim 9, wherein said interrupt controller is responsive to the deactivation of said DMA enabling signal for supplying said host processor with a second message indicating that the received frames to be processed by said host processor are held in said system memory.

11. A system for receiving data frames from a plurality of terminals under control of a host processor comprising:

a controller responsive to said data frames for providing an interface between said terminals and said host processor, said controller having a memory buffer for holding data frames received from said terminals for processing by said host processor, a system memory having a capacity larger than said memory buffer for storing the data frames received from said plurality of terminals, and a direct memory access (DMA) transport circuit responsive to said controller for transferring the data frames received from said terminals to said system memory, wherein said controller includes a DMA engaging circuit responsive to the received data frames for transferring the data frames stored in said buffer memory to said memory buffer via said DMA transport circuit, and a switch back circuit monitoring mode selecting signals and, when in auto-DMA mode, if a zero value exists in a DMA frame counter when no frames are being read from said buffer for automatically disengaging said DMA transport circuit.

12. The system of claim 11, wherein said host processor reads a count of said DMA frame counter to determine a number of data frames to be processed.

13. The system of claim 12, wherein said DMA frame counter is reset by said host processor after reading said count.

14. The system of claim 13, wherein said switch back circuit further comprises a switch control circuit responsive to said count for disengaging said DMA transport circuit from said memory buffer.

15. The system of claim 14, wherein said switch control circuit prevents said DMA transport circuit from being disengaged from said memory buffer while a frame is being read from said memory buffer.

16. The system of claim 15, wherein said host processor is responsive to a first message indicating that a complete frame has been transferred via said DMA transport circuit.

17. The system of claim 16, wherein said first message is generated by an interrupt controller provided with a DMA enabling signal from said switch control circuit to interrupt said host processor when a complete frame has been transferred via said DMA transport circuit.

18. The system of claim 17, wherein said DMA enabling signal is provided to a DMA access circuit to request said DMA transport circuit to be engaged.

19. The system of claim 18, wherein said switch control circuit deactivates said DMA enabling signal to disengage said DMA transport circuit.

20. The system of claim 19, wherein said interrupt controller is responsive to deactivation of said DMA enabling signal for providing said host processor with a second message indicating that the received frames to be processed by said host processor are held in said buffer means.

21. The system of claim 11, wherein said host processor configures said controller to automatically engage said DMA transport circuit when overflow of said memory buffer is anticipated.

22. In a network controller having a memory buffer for holding data frames, a method of switching from a DMA data transfer mode to a non-DMA data transfer mode for transferring the data frames received comprising the steps of:

setting said network controller into a non-DMA data transfer mode to transfer received data frames stored in the memory buffer for processing by a host processor to a desired location, switching the network controller to a DMA transfer mode to transfer the received data frames via a DMA controller into a system memory when overflow of the buffer is anticipated, and automatically switching the network controller back to the non-DMA data transfer mode when monitoring mode selecting signals and, when, in auto-DMA mode, a zero value exists in a DMA frame counter when no frames are being read from said buffer.

23. The method of claim 22, wherein the network controller is switched back to the non-DMA data transfer mode when the host processor completes processing the data frames transferred via the DMA controller.

* * * * *